UNITED STATES PATENT OFFICE.

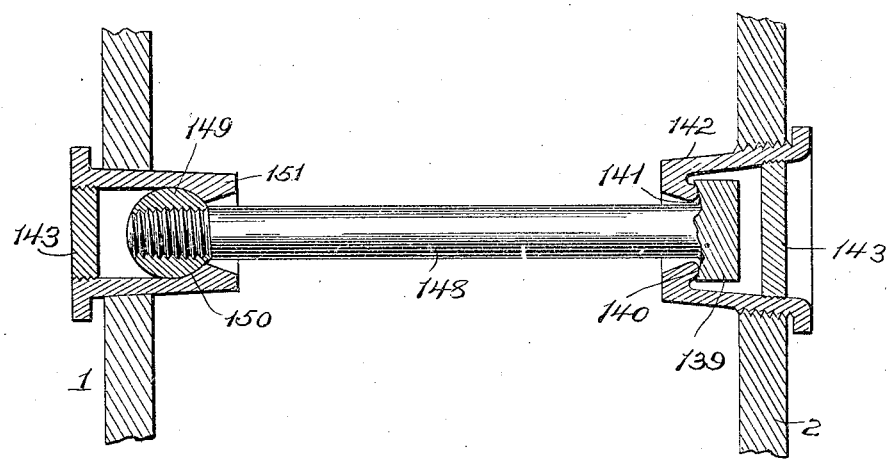

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,050.     Specification of Letters Patent.     Patented Oct. 28, 1913.

Original application filed September 25, 1911, Serial No. 651,051. Divided and this application filed September 21, 1912. Serial No. 721,672.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

The accompanying drawing is a view in longitudinal section partly in elevation of a bolt embodying my invention.

1 represents the inside plate of a locomotive boiler, 2 the outside plate, each carrying a bushing, which in the present instance are cone shaped, the bushing 151 in the inside plate 1 having a smooth exterior and the other bushing 142 in the outside plate, having threads for its attachment to said plate. The bolt shank 148 is formed with an integral head 139 at one end and a removable nut 149 at the other end, both the head and the nut being so formed as to allow universal angular movement of the bolt shank relatively to its connection with the side walls. The integral head 139 is formed with a slightly rounded or concave inner face 140, engaging an annular convex seat 141 formed on the hollow bushing 142. The opposite end of the bolt shank 138 carries a spherical nut 149 on its threaded end, engaging a concave seat 150 formed in the bushing 151 carried by the inside plate 1.

This structure is simple and cheap and affords an ample degree of universal angular movement practically at the extreme ends of the bolt.

If desired I may close the bushings 142 and 151, by plugs 143 screwed into the bushings and concealing the bolt shank heads.

Having fully described my invention what I claim as new and desire to secure by Letters-Patent, is:—

1. A stay bolt comprising tubular connectors one having a concave seat and the other a convex seat, and a bolt shank having two heads one having a concave surface to engage the convex seat in one connector, and the other a convex surface to engage the concave seat in the other connector.

2. A stay bolt comprising two tubular connectors one having a concave seat and the other a convex seat, and a bolt shank having two heads, one integral with said shank and having a concave surface to engage the convex seat in one connector, and the other head threaded to the bolt shank and spherical in shape to engage the concave seat in the other connector.

In testimony whereof, I have signed this specification in the presence of two subscribing witnesses.

ETHAN I. DODDS.

Witnesses:
    A. W. BRIGHT,
    GEO. F. DOWNING.